United States Patent Office 3,686,173
Patented Aug. 22, 1972

3,686,173
SUBSTITUTED THIAZOLO[3,2-a]PYRIMIDES
William J. Houlihan, 15 Raynold Road, and Robert E. Manning, 30 Laurel Hill Road, both of Mountain Lakes, N.J. 07046
No Drawing. Continuation-in-part of application Ser. No. 790,451, Jan. 10, 1969, which is a continuation-in-part of abandoned application Ser. No. 748,934, July 31, 1968. This application Dec. 29, 1969, Ser. No. 888,977
Int. Cl. C07d 51/46
U.S. Cl. 260—251 A                8 Claims

ABSTRACT OF THE DISCLOSURE

Substituted 3-aryl-2-alkyl thiazolo pyrimidines, e.g., 3-(4'-chlorophenyl) - 2 - ethyl - 3 - hydroxy-2,3,6,7-tetrahydro-5H-thiazolo[3,2-a]pyrimidine, are prepared from 2-haloalkylphenones and 3,4,5,6-tetrahydro-2-pyrimidinethiol and are useful as anti-depressants.

This application is a continuation-in-part of application Ser. No. 790,451 filed Jan. 10, 1969, now abandoned which in turn is a continuation-in-part of application Ser. No. 748,934, filed July 31, 1968, now abandoned.

This invention relates to novel heterocyclic compounds. More specifically it relates to novel 2-alkyl 3-substituted phenyl-thiazolo[3,2-a]pyrimidines, intermediates therefor, acid addition salts thereof, and process for their preparation.

The pyrimidines of the present invention may be represented by the formula

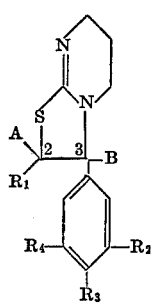

(I)

wherein each of $R_2$, $R_3$ and $R_4$, independently, represents H or halogen having an atomic weight of about 19 to 36,
$R_1$ represents straight chain lower alkyl, i.e., straight chain alkyl having 1–4 carbon atoms such as methyl, ethyl and propyl,
A is H,
B is OH, or
A and B together represent a carbon to carbon bond, provided at least one of $R_2$, $R_3$ and $R_4$ is other than H.

Preferred aspects of this invention are those wherein $R_1$ represents ethyl or methyl, $R_3$ represents chloro, and $R_2$ and $R_4$ represent H.

The process for preparing compounds of Formula I where A and B represent a carbon to carbon bond may be represented as follows:

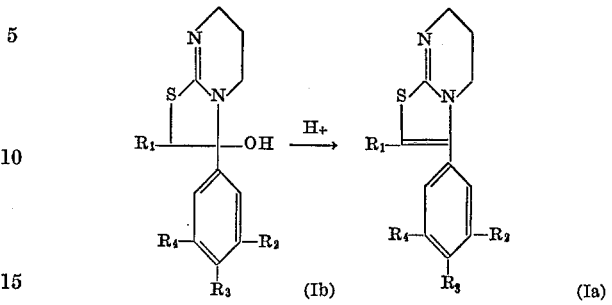

where $R_1$, $R_2$, $R_3$ and $R_4$ have the above stated significance.

The pyrimidines of Formula Ia are prepared from the compounds of Formula Ib or an acid addition salt thereof by treatment with an acid such as hydrochloric acid, hydrobromic acid or preferably acetic acid. Although not critical, the reaction may be carried out at a temperature up to about the reflux temperature of the system and preferably at a temperature of between 50° C. to 70° C. The reaction may be carried out in excess acid or, if desired, in solvent which is inert under the reaction condition; but use of solvent and the particular solvent utilized is not critical. Solvents which may be used include water, lower alkanols such as ethanol, isopropanol and the like. acetone, tetrahydrofuran, and similar inert solvents.

When the compounds of Formula Ia are in the form of an acid addition salt they may be converted to the free base by conventional methods such as suspending the salt form in water and adding sodium carbonate.

The 3-hydroxy thiazolo[3,2-a]pyrimidines of Formula Ib may be prepared in acid addition salt form in accordance with the following reaction scheme:

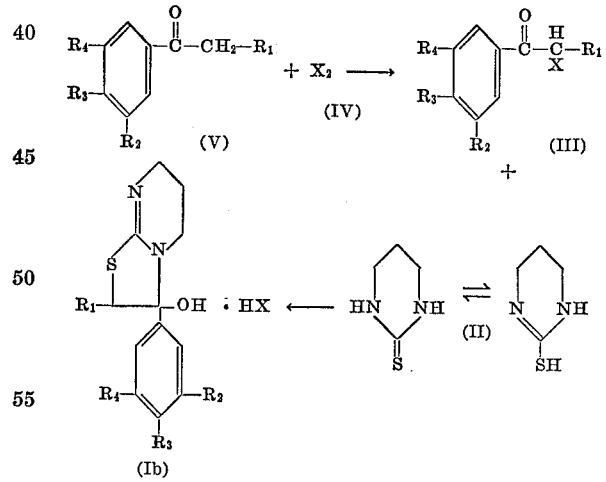

where $R_1$, $R_2$, $R_3$ and $R_4$ have the above stated significance and X is Br or Cl.

The 3-hydroxy thiazolo[3,2-a]pyrimidines of Formula Ib are prepared by halogenating an alkyl phenyl ketone (V), e.g., 4'-chlorobutyrophenone, with bromine or chlorine (IV) in an inert solvent such as chloroform, carbontetrachloride, methylenechloride or the like, at a temperature of 0°–50° C., preferably 20°–35° C., for about 1 to 8 hours. The resulting 2-haloalkylphenone (III) is treated with 3,4,5,6-tetrahydro-2-pyrimidinethiol (II) in an inert solvent such as acetone or lower alkanols having 1 to 5 carbon atoms, e.g., methanol or ethanol, at a temperature of between about 20°–50° C., preferably 25° to 30° C. for about 3 to 48 hours to give the desired hydroxy compounds. Standard techniques may be used to recover the 3-hydroxy thiazolo[3,2-a]pyrimidines.

When the compounds of Formula Ib above are recovered as their acid addition salts and it is desired to convert such salts to the corresponding free bases, conventional techniques may be utilized, e.g., dissolution of the salt in water and precipitating with a base such as sodium hydroxide.

The compounds of Formula Ib may also be illustrated by their tautomeric equivalents such as represented by the following structural formula

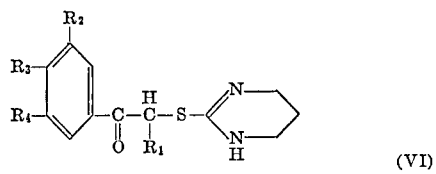

(VI)

where $R_1$, $R_2$, $R_3$ and $R_4$ have the above-stated significance, and it should be appreciated that these tautomers can exist in equilibrium. The predominant tautomer is believed to depend on such factors as whether the compound is a solid or in solution, and the pH and polarity of the environment. In order to simplify this disclosure, however, Formula Ib only will be used, although both tautomeric forms are considered to be within the concept of the present invention.

It is further recognized that the compounds of Formula Ib exist as geometric and optical isomers, the separation and recovery of which may be accomplished employing conventional techniques. All of these isomers (geometric and optical) are included within the scope of this invention.

The pyrimidines of Formula II and many of the compounds of Formula V are known and are prepared by methods disclosed in the literature. Those not specifically disclosed are prepared from known materials using analogous methods.

The compounds of Formulas Ia and Ib are useful because they possess pharmacological activity in animals. More particularly, the compounds possess CNS stimulant activity and are useful as antidepressants as indicated by their activity in the mouse given parenterally 2.5–20 mg./kg. of body weight of active material. The test method used is basically as described by Spencer, P.S.J., Antagonism of Hypothermia in the Mouse by Antidepressants, in Antidepressand Drugs, pp. 194–204, Eds. S. Garattini and M.N.G. Dukes, Excerpta Medica Foundation, 1967.

The compounds of Formulas Ia and Ib are also useful as anorexics as indicated by their activity in rat given 25 mg./kg. of active material and tested by use of the free feeding method described by Randall, et al. (J.P.E.T., 129, 163,1960) whereby 16 groups of six male Wistar rats are deprived of food for 18 hours but receive water ad libitum. Consumption of ground food is then measured over a four hour period following oral administration of the active compound.

For such use, the Compounds Ia or Ib may be combined with a pharmaceutically acceptable carrier or adjuvant, and may be administered orally in such forms as tablets, capsules, elixiris, suspensions and the like, or parenterally in the form of an injectable solution or suspension. The dosage will vary depending upon the mode of administration utilized and the particular compound employed.

These compounds of Formulas Ia and Ib may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate and the like.

In general, satisfactory results for anorexic or antidepressant activity are obtained when the compounds are administered at a daily dosage of from about 0.5 to 50 milligrams per kilogram of animal body weight. This daily dosage is preferably given in divided doses, e.g., 2 to 4 times a day, or in sustained release form. For most large animals, the total daily dosage is from about 35 to 300 milligrams and dosage forms suitable for internal administration comprise from about 9 to 150 milligrams of the compound in admixture with a solid or liquid pharmaceutical carrier or diluent.

A representative formulation suitable for oral administration is a tablet prepared by standard tabletting techniques which contains the following:

| Ingredient: | Parts by wt. |
|---|---|
| 3-(4'-chlorophenyl)2-ethyl-3-hydroxy - 2,3,6,7-tetrahydro-5H-thiazolo[3,2 - a]pyrimidine | 10 |
| Tragacanth | 2 |
| Lactose | 79.5 |
| Corn starch | 5 |
| Talcum | 3 |
| Magnesiun stearate | 0.5 |

EXAMPLE 1

3(4'-chlorophenyl)-2-ethyl-3-hydroxy-2,3,6,7-tetrahydro-5H-thiazolo[3,2-a]pyrimidine hydrobromide

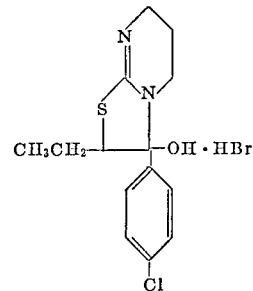

A flask (equipped with a stirrer and dropping funnel) is charged with 54 g. (0.30 mole) of 4'-chlorobutyrophenone and 250 ml. of chloroform. The solution is stirred and a solution of 48.0 g. (16.0 ml., 0.3 mole) of bromine and 250 ml. of chloroform is added (dropwise) at a rate such that the internal flask temperature does not exceed 35° C. The resulting solution is stirred for one hour and the solvent removed in vacuo. The residue is dissolved in 150 ml. of isopropanol and added in one portion to a slurry of 30.6 g. (0.30 mole) of 3,4,5,6-tetrahydro-2-pyrimidinethiol and 500 ml. of isopropanol. The reaction is exothermic and a solution results. In about one hour a solid comes out of solution. Stirring is continued for 24 hours at room temperature at which time the resultant solid is filtered off to give 3-(4'-chlorophenyl)-2-ethyl-3-hydroxy-2,3,6,7 - tetrahydro-5H-thiazolo[3,2-a]pyrimidine hydrobromide; M.P. 181°–181.5° C.

When the above process is carried out and 3'-chlorobutyrophenone, 4'-fluorobutyrophenone, 3',4'-dichlorobutyrophenone, 4' - chlorovalerophenone, or 4'-chlorohexanophenone is used in place of 4'-chlorobutylrphenone, there is obtained 3-(3'-chlorophenyl)-2-ethyl-3-hydroxy-2,3,6,7-tetrahydro-5H-thiazolo[3,2-a]pyrimidine hydrobromide (M.P. 202°–203° C.), 2-ethyl-3-hydroxy-3-(4'-fluorophenyl)-2,3,6,7-tetra-
hydro-5H-thiazolo[3,2-a]pyrimidine hydrobromide
(M.P. 195°–196° C.), 3-(3',4'-dichlorophenyl)-2-ethyl-3-hydroxy-2,3,6,7-
tetrahydro-5H-thiazolo[3,2-a]pyrimidine hydro-
bromide (M.P. 222° C.), 3-(4'-chlorophenyl)-3-hydroxy-2-n-propyl-2,3,6,7-tetra-
hydro-5H-thiazolo[3,2-a]pyrimidine hydrobromide
(M.P. 180°–182° C.), or 2-n-butyl-3-(4'-chlorophenyl)-3-hydroxy-2,3,6,7-tetra-
hydro-5H-thiazolo[3,2-a]pyrimidine hydrobromide
(M.P. 214°–215° C.), respectively.

EXAMPLE 2

3-(4'-chlorophenyl)-2-ethyl-6,7-dihydro-5H-thiazolo-
[3,2-a]pyrimidine hydrobromide

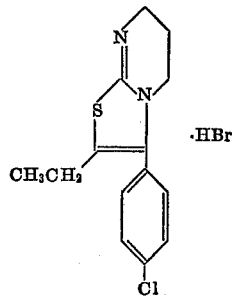

A mixture of 30 g. of 3-(4'-chlorophenyl)-2-ethyl-3-
hydroxy - 2,3,6,7 - tetrahydro - 5H-thiazolo[3,2-a]py-
rimidine hydrobromide and 250 ml. acetic acid is refluxed
for 15 hours. The solvent is then removed in vacuo and
the residue stirred with 100 ml. of isopropanol. The solid
is filtered off to give 3-(4'-chlorophenyl)-2-ethyl-6,7-di-
hydro-5H-thiazolo[3,2-a]pyrimidine hydrobromide, M.P.
221°–223° C.

When the above process is carried out and each of the
hydroxy compounds (Ib) set out in the last paragraph
of Example 1 is utilized in place of 3-(4'-chlorophenyl)-2-
ethyl - 3-hydroxy-2,3,6,7-tetrahydro-5H-thiazolo[3,2-a]-
pyrimidine hydrobromide, there is obtained 3-(3'-chlorophenyl)-2-ethyl-6,7-dihydro-5H-thiazolo-
[3,2-a]pyrimidine hydrobromide (M.P. 206°–209°
C.), 2-ethyl-3-(4'-fluorophenyl)-6,7-dihydro-5H-thiazolo-
[3,2-a]pyrimidine hydrobromide (M.P. 220°–222° C.), 3-(3',4'-dichlorophenyl)-2-ethyl-6,7-dihydro-5H-
thiazolo[3,2-a]pyrimidine hydrobromide (M.P. 258°–
259° C.), 3-(4'-chlorophenyl)-2-n-propyl-6,7-dihydro-5H-
thiazolo[3,2-a]pyrimidine hydrobromide (M.P. 220°–
230° C.), or 2-n-butyl-3-(4'-chlorophenyl)-6,7-dihydro-5H-thiazolo-
[3,2-a]pyrimidine hydrobromide (M.P. 247°–249°
C.), respectively.

What is claimed is:

1. A compound of the formula

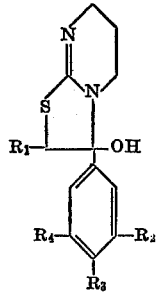

wherein
each of $R_2$, $R_3$ and $R_4$ independently represent hydroxy
or halogen having an atomic weight of about 19 to 36,
$R_1$ represents straight chain lower alkyl,
provided at least one of $R_2$, $R_3$ and $R_4$ is other than H,
or a pharmacologically acceptable acid addition salt
thereof.

2. A compound according to claim 1 of the formula

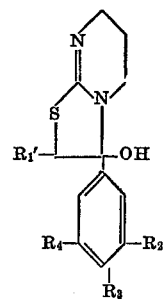

wherein
each of $R_2$, $R_3$ and $R_4$, independently, represent hydro-
gen or halogen having an atomic weight of about
halogen having an atomic weight of about 19 to 36,
19 to 36, and
$R_1'$ represents methyl or ethyl,
provided at least one of $R_2$, $R_3$ and $R_4$ is other than hydro-
gen or a pharmacologically acceptable acid addition salt
thereof.

3. The compound of claim 1 which is 3-(4'-chloro-
phenyl) - 2 - ethyl - 3 - hydroxy-2,3,6,7-tetrahydro-5H-
thiazolo[3,2-a]pyrimidine.

4. The compound of claim 1 which is 3-(3'-chloro-
phenyl) - 2 - ethyl - 3 - hydroxy-2,3,6,7-tetrahydro-5H-
thiazolo[3,2-a]pyrimidine.

5. The compound of claim 1 which is 2-ethyl-3-hydroxy-
3 - (4' - fluorophenyl) - 2,3,6,7-tetrahydro-5H-thiazolo-
[3,2-a]pyrimidine.

6. The compound of claim 1 which is 3-(3',4'-dichloro-
phenyl) - 2 - ethyl - 3 - hydroxy-2,3,6,7-tetrahydro-5H-
thiazolo[3,2-a]pyrimidine.

7. The compound of claim 1 which is 3-(4'-chloro-
phenyl) - 3 - hydroxy-2-n-propyl-2,3,6,7-tetrahydro-5H-
thiazolo[3,2-a]pyrimidine.

8. The compound of claim 1 which is 2-n-butyl-3-(4'-
chlorophenyl) - 3-hydroxy-2,3,6,7-tetrahydro-5H-thiazolo-
[3,2-a]pyrimidine.

References Cited
UNITED STATES PATENTS 3,507,868   4/1970   Manning _____ 260—251
3,169,970   2/1965   Snyder _____ 260—306.8

ALEX MAZEL, Primary Examiner
R. V. RUSH, Assistant Examiner

U.S. Cl. X.R.
424—251